(12) United States Patent
Forster et al.

(10) Patent No.: US 10,954,107 B2
(45) Date of Patent: Mar. 23, 2021

(54) GRIPPER WITH DAMPING SYSTEM FOR GRIPPING A FUEL ELEMENT

(71) Applicant: Framatome GmbH, Erlangen (DE)

(72) Inventors: Peter Forster, Stadtlauringen (DE); Christian Gratz, Buckenhof (DE); Stefan Stark, Effeltrich (DE)

(73) Assignee: FRAMATOME GMBH, Erlangen (DE)

( * ) Notice: Subject to any disclaimer, the term of this patent is extended or adjusted under 35 U.S.C. 154(b) by 34 days.

(21) Appl. No.: 16/329,805

(22) PCT Filed: Aug. 23, 2017

(86) PCT No.: PCT/EP2017/071233
§ 371 (c)(1),
(2) Date: May 6, 2019

(87) PCT Pub. No.: WO2018/041693
PCT Pub. Date: Mar. 8, 2018

(65) Prior Publication Data
US 2019/0270619 A1 Sep. 5, 2019

(30) Foreign Application Priority Data
Sep. 1, 2016 (DE) ...................... 10 2016 116 392.9

(51) Int. Cl.
*B66C 1/66* (2006.01)
*G21C 19/105* (2006.01)
*B66C 1/34* (2006.01)

(52) U.S. Cl.
CPC .............. *B66C 1/66* (2013.01); *G21C 19/105* (2013.01); *B66C 1/34* (2013.01)

(58) Field of Classification Search
CPC .... B66C 1/34; B66C 1/40; B66C 1/66; B66C 13/04; G21C 19/10; G21C 19/105; G21C 19/11; G21C 19/115; Y10S 294/906
(Continued)

(56) References Cited

U.S. PATENT DOCUMENTS 2,058,186 A * 10/1936 Spalding ................. E21B 19/04
294/82.16
2,576,261 A * 11/1951 Minor ..................... E21B 19/04
294/82.16
(Continued)

FOREIGN PATENT DOCUMENTS

| DE | 3120165 A1 | 3/1982 |
| DE | 102008024358 A1 | 12/2009 |
| GB | 1042557 A | 9/1996 |

OTHER PUBLICATIONS

PCT International Search Report and Written Opinion dated Nov. 24, 2017 from corresponding Application No. PCT/EP2017/071233, 13 pages.

*Primary Examiner* — Dean J Kramer
(74) *Attorney, Agent, or Firm* — Dilworth IP, LLC (57) ABSTRACT

A gripper a fuel element, comprises a housing, an inner part arranged inside the housing, the inner part and the housing being displaceable relative to one another in an axial direction, with the inner part movable between a first end position and a second end position, a catch member movable between a gripping position and a release position, a gripper spring between the housing inner part counteracting movement of the inner part from the second end position, or an intermediate position (Z) between the first and second end position, to the first end position, and a damping system comprising a first and second connecting member for connecting the damping system to the housing, inner part and/or the fuel element loading machine, and a spring member arranged on
(Continued)

the first and/or the second connecting member counteracting movement of the inner part from an intermediate position (Z) to the second end position.

13 Claims, 6 Drawing Sheets

(58) Field of Classification Search
USPC .......................................... 294/82.16, 86.41
See application file for complete search history.

(56) References Cited

U.S. PATENT DOCUMENTS

| | | | | | |
|---|---|---|---|---|---|
| 2,860,908 | A | * | 11/1958 | Peterson | B66C 13/04 |
| | | | | | 294/82.15 |
| 4,312,124 | A | * | 1/1982 | Calhoun | B23P 19/025 |
| | | | | | 29/726 |
| 4,438,910 | A | * | 3/1984 | McFadden | B66C 1/34 |
| | | | | | 188/282.8 |
| 4,609,219 | A | * | 9/1986 | Go | B66C 1/66 |
| | | | | | 294/82.24 |
| 5,066,059 | A | * | 11/1991 | Egbert | E21B 19/09 |
| | | | | | 294/82.16 |
| 8,562,047 | B2 | * | 10/2013 | Parker | B66C 1/66 |
| | | | | | 294/67.32 |

\* cited by examiner

GRIPPER WITH DAMPING SYSTEM FOR GRIPPING A FUEL ELEMENT

The invention relates to a gripper with a damping system for gripping a fuel element.

BACKGROUND OF THE INVENTION

The gripper of a fuel element loading machine, which is used to transport fuel elements within a nuclear facility, comprises a housing for fastening the gripper to the fuel element loading machine, for example to a telescoping mast of the fuel element loading machine, and an inner part arranged to be axially displaceable inside the housing. For gripping and putting down the fuel element, the inner part is moved to a first end position. During the transport of the fuel element, the inner part is in a second end position. Arranged on the inner part are one or more catch members which are movable between a gripping position and a release position and engage a handle or bracket of the fuel element thereby establishing a force-closed connection with the fuel element when the latter is coupled to the catch members.

The housing of the gripper has guide grooves, typically two guide grooves, in which stop members fastened to the inner part, for example keys, are guided. The guide grooves here constitute lower and upper mechanical stops for the stop members in the first and second end positions of the inner part. This establishes the flux of force between the inner part and the housing. A block tooth system engages between the inner part and the housing, wherein, depending on the position of the catch members, i.e. gripping position or release position, a tooth projects into one of the two recesses of the block tooth system to reliably retain the catch member in its respective position. Further, a gripper spring which preloads the inner part relative to the housing via the stop members is arranged in axial direction between the inner part and the housing.

In normal operation, i.e. when operating without interference, the fuel element is, during transport, held at the gripper via the catch members, which are then in their gripping position. In this case, each stop member rests on the lower stop of its guide groove, and the block tooth system engages such that the catch member is retained in its gripping position. When the gripper makes contact, i.e. during gripping or releasing at the beginning or end of the transport, the fuel element stands on its base and the inner part presses onto the fuel element, i.e. its handle or bracket. The weight of the fuel element loading machine, i.e. its telescoping mast, causes compression of the gripper spring, so that the housing is displaced downwards relative to the inner part until the keys abut the upper stop of the guide grooves and the inner part is in the first end position. The block tooth system opens and the catch members can be opened, for example using a pneumatic piston.

During the downward movement of the gripper holding the fuel element, however, the base of the fuel element may potentially come to rest on an interfering edge, for example on storage racks present inside a fuel element storage pool, i.e. their top edges, or on so-called absorber ducts, with the result that the handle or bracket of the fuel element no longer rests directly on the catch member but is lifted off the latter. If the fuel element then slips off the interfering edge, there will be a short moment in which it is in a free fall, i.e. it falls into the catch members of the gripper. The resulting impact constitutes an additional dynamic load for the support structure of the fuel element, the gripper and the fuel element loading machine. Such an overload situation may cause damage to the fuel element, the gripper or the fuel element loading machine.

DE 10 2008 024 358 A1, for example, discloses a reactor crane or fuel element loading machine with a gripper for gripping fuel elements, wherein a device for overload protection is provided for said reactor crane or fuel element loading machine.

It is therefore an object of the invention to reduce an additional load caused by a fuel element falling into the catch members of the gripper in order to avoid damage to the fuel element, the gripper or the fuel element loading machine.

SUMMARY OF THE INVENTION

This object is achieved by a gripper for gripping a fuel element with the features according to claim 1. Advantageous configurations and modifications are specified in the respective dependent claims.

The gripper for gripping a fuel element comprises a housing for fastening the gripper to a fuel element loading machine and an inner part arranged inside said housing, the inner part and the housing being arranged to be displaceable relative to one another in an axial direction such that the inner part is movable between a first end position and a second end position. For gripping the fuel element, the gripper comprises at least one catch member which is movable between a gripping position and a release position. The gripper further comprises a gripper spring arranged in axial direction between the housing and the inner part. The gripper spring preloads the inner part relative to the housing and counteracts a movement of the inner part relative to the housing and/or the fuel element loading machine from the second end position, and/or an intermediate position in axial direction between the first and second end positions, to the first end position. The gripper comprises a damping system for damping an overload at the gripper and/or the fuel element loading machine. The damping system comprises at least a first connecting member for connecting the damping system to the housing of the gripper and a second connecting member for connecting the damping system to the inner part of the gripper, or at least a first connecting member for connecting the damping system to the fuel element loading machine and a second connecting member for connecting the damping system to the housing of the gripper, or at least a first connecting member for connecting the damping system to the fuel element loading machine and a second connecting member for connecting the damping system to the inner part of the gripper. The damping system further comprises at least one spring member which is arranged on the first and/or the second connecting member such that it counteracts a movement of the inner part relative to the housing and/or the fuel element loading machine from the intermediate position to the second end position, i.e. a movement of the housing relative to the fuel element loading machine in the case of a movement of the inner part from the intermediate position to the second end position.

In other words, the damping system comprises a first connecting member for connecting the damping system to the housing and a second connecting member for connecting the damping system to the inner part, or a first connecting member for connecting the damping system to the fuel element loading machine and a second connecting member for connecting the damping system to the housing, or a first connecting member for connecting the damping system to the fuel element loading machine and a second connecting member for connecting the damping system to the inner part. The spring member is connected to, or arranged on, the first and/or the second connecting member such that if the first connecting member is connected to the housing or the fuel element loading machine and the second connecting member is connected to the inner part, it counteracts a movement of the inner part relative to the housing or the fuel element loading machine, and if the first connecting member is connected to the fuel element loading machine and the second connecting member is connected to the housing, it counteracts a movement of the housing relative to the fuel element loading machine in the case of a movement of the inner part from the intermediate position to the second end position.

The inner part and the housing are displaceable relative to one another in an axial direction, which, during operation of the gripper, corresponds to a vertical direction. The inner part typically has a stop member which is guided in a recess of the housing extending in axial direction and in the first end position abuts a first stop face of the recess, in the case of a vertical orientation of the gripper an upper stop face. The first end position is in this case assumed during the gripping or releasing of the fuel element. The inner part initially rests on the fuel element, and the weight of the fuel element loading machine, i.e. the telescoping mast to which the housing of the gripper is fastened, then causes compression of the gripper spring, so that the housing is displaced downwards relative to the inner part until the stop member abuts the first, upper stop face of the recess and the inner part is in the first end position. The first end position thus designates a maximum possible position of the inner part relative to the housing in which there is a minimum distance in axial direction between the inner part and the housing. The gripper spring counteracts this movement of the inner part to the first end position.

The second end position designates the maximum possible position of the inner part relative to the housing which the inner part can assume due to mechanical stops, i.e. the stop member, in which there is a maximum distance between the inner part and the housing, and which the inner part can maximally assume in the case of an overload occurring at the gripper. The force of the gripper spring generally pushes the inner part away from the housing, and the gripper spring cannot, or only to a limited extent, absorb the load occurring in an overload situation.

The intermediate position designates the position of the inner part relative to the housing which the inner part can assume in normal operation, i.e. when operating with normal load without interference, during the transport of a fuel element, the lifting or lowering of a fuel element, or during an empty run of the fuel element loading machine. Here again, the inner part is pushed away from the housing by the force of the gripper spring.

The invention now provides a damping system through which, when transporting or vertically lifting or lowering a fuel element, the inner part will not assume the maximum possible second end position reachable via mechanical stops, i.e. the stop members, but the intermediate position located in axial direction between the first and second end positions. The damping system is in this case configured such that it responds in an overload situation, i.e. counteracts a movement of the inner part from the intermediate position to the second end position and thus damps a movement of the inner part beyond the intermediate position. If the fuel element slips off in the vertical direction during the transport or during lifting or lowering and falls into the catch member arranged on the inner part, the distance between the intermediate position and the second end position can be used to catch the fall of the fuel element and damp the resulting impact. This avoids damage to the support structure of the fuel element as well as the gripper or the fuel element loading machine.

The gripper spring thus counteracts a vertical upward movement of the inner part whereas the damping system counteracts a downward movement of the inner part or the housing. In other words, the force exerted on the inner part by the gripper spring acts in the vertical downward direction whereas the force exerted on the inner part or the housing by the damping system acts in the vertical upward direction. The gripper spring here responds to a movement of the inner part between the intermediate position and the first end position whereas the damping system responds to a movement of the inner part between the intermediate position and the second end position.

Each of the first and second connecting members may in this case be arranged on, and connected to, the housing of the gripper and/or the fuel element loading machine, or the inner part and/or the housing of the gripper, either directly or indirectly. Due to the displaceability of the inner part relative to the housing and/or the fuel element loading machine, the first connecting member is likewise displaceable relative to the second connecting member. In other words, in an overload situation, i.e. in the case of a movement of the inner part from the intermediate position to the second end position, the first connecting member is moved relative to the second connecting member, so that their distance from one another changes.

The concept of a connection with the inner part or the housing and/or the fuel element loading machine here is to be understood as a coupling of the first or second connecting member, and thus the damping system, to the gripper, which allows the transfer of an overload occurring at the inner part to the damping system and, if applicable, diversion of the load via the housing or the fuel element loading machine. In an overload situation, an overload occurring at the inner part is thus transferred via the second connecting member to the damping system, where it is compensated by the at least one spring member. The advantage of the gripper or the damping system according to the invention consists in the fact that it operates purely mechanically and does therefore not require any hydraulic or pneumatic components or a power supply. As a result, the damping system also responds without time delay as soon as the inner part is moved beyond the intermediate position. The arrangement of the damping system on the gripper itself further allows a space-saving arrangement without affecting the functionality of the gripper or the fuel element loading machine. The damping system can further be fastened to the gripper without the need for complex modification of its existing structure.

The first connecting member is preferably fastened to an inner or outer circumferential surface of the housing or the fuel element loading machine, in particular a telescoping mast of the fuel element loading machine, through at least one fastener, and/or the first connecting member is mounted in a recess on the inner or outer circumferential surface of the housing in a form- or force-closed manner, and/or the first connecting member is configured as a part of the fuel element loading machine or the housing and is thus integral with the fuel element loading machine. A variety of fasteners commonly known to those skilled in the art, such as screws, may be considered here. In order to additionally or solely connect the first connecting member to the housing in a form- and force-closed manner, for example, a recess in the form of a groove is worked into the outer or inner circumferential surface of the housing or the fuel element loading machine.

Each of the first and second connecting members preferably comprises an annular plate which, in particular completely, surrounds the housing and/or the fuel element loading machine, in particular the telescoping mast of the fuel element loading machine, i.e. the inner part and/or the housing. The annular plate may in this case again be configured as a part of the housing and/or the fuel element loading machine.

In a preferred configuration of the gripper, i.e. the damping system, the second connecting member comprises at least one first load transfer member which is mounted in a recess on an outer circumferential surface of the inner part or is fastened to the inner part. The load transfer member is to transfer a load occurring at the inner part in an overload situation to the damping system. The stop members already fastened to the inner part, for example the keys, are preferably used as the first load transfer members.

In another advantageous embodiment of the gripper, i.e. the damping system, the second connecting member comprises at least one first load transfer member and at least one second load transfer member, wherein the first load transfer member is mounted in said recess on an outer circumferential surface of the inner part, and wherein the first load transfer member abuts a second load transfer member at least in the intermediate position and/or in the second end position of the inner part to transfer a load occurring at the inner part in an overload situation via the first load transfer member to the second load transfer member and thus to the damping system. In normal operation, the first and the second load transfer member, which is configured in particular as an annular plate, lie flat against one another in a contact region when the inner part is in the intermediate position. In an overload situation, the overload is transmitted from the first load transfer member to the second load transfer member and thus to the damping system, which then counteracts the movement of the inner part from the intermediate position to the second end position. In this case as well, the first load transfer member is formed in particular by a stop member which is mounted to be axially displaceable inside a recess of the housing and in the first end position of the inner part abuts an upper stop face of said recess. In normal operation, the first load transfer member abuts the second load transfer member in the intermediate position. In an overload situation, and thus in the second end position, the first load transfer member abuts a lower stop face of the recess. In this case as well, the stop members, i.e. keys, of the gripper may, for example, serve as the first load transfer members.

The at least one spring member preferably rests with a first end against the first connecting member and with a second end against the second connecting member, in particular the first or second load transfer member. In other words, the first connecting member forms a first stop face for the first end of the spring member, and the second connecting member forms a second stop face for the second end of the spring member. The at least one spring member is thus arranged between the first and second connecting members. As a result, a load occurring in an overload situation is transferred from the second connecting member coupled to the inner part to the damping system, where it is at least partially absorbed through compression of the at least one spring member, and is diverted via the first connecting member to the housing and/or to the fuel element loading machine. The at least one spring member is in this case preloaded such that a load acting on the damping system in normal operation will not compress the spring member. The spring member will be compressed only in an overload situation, i.e. once the vertically acting force exceeds the preloading force.

In another preferred embodiment, the at least one spring member rests with a second end against a stop face of the second connecting member facing away from the first connecting member. Further, the first connecting member and the second connecting member are indirectly or directly fixed to one another in a releasable manner, said fixation being releasable in the case of a movement of the inner part from the intermediate position to the second position. In this case as well, the at least one spring member is preloaded such that a load acting on the damping system in normal operation will not compress the spring member and a compression of the spring member will occur only in an overload situation.

In an advantageous configuration, the first connecting member and/or the second connecting member, in particular the second load transfer member, have a convex curved surface, i.e. a slightly domed surface, or a planar or flat surface, which abuts the recess of the housing and/or the first load transfer member. In the case of a convex curved surface, an ideally punctiform or linear support surface of the first and second connecting members on the housing and the first load transfer member, respectively, is achieved, which improves the load transfer to the damping system and from the damping system to the housing of the gripper. The force acting in an overload situation is in this case transferred to the damping system or the first or second connecting member or the load transfer member in a direction perpendicular to the surface and thus almost centrally, so that additional loads possibly caused by leverage are avoided. Alternatively, the first and/or second connecting member, in particular the second load transfer member, may have a planar surface facing the first load transfer member, provided that the structure of the damping system, i.e. its connection to the gripper, ensures that the second load transfer member and the first load transfer member rest on one another in a planar manner, i.e. enclose a flat contact surface between them.

To preload the damping system, the damping system preferably comprises at least one preloading member for preloading the at least one spring member which is arranged on, i.e. fixed to, the first connecting member and is mounted so as to be movable relative to the second connecting member, or is fixed to the second connecting member and is mounted so as to be movable relative to the first connecting member. In normal operation, the at least one spring member is preloaded such that it is very stiff and will not compress. In an overload situation, i.e. when the force acting on the damping system exceeds the preload of the at least one spring member, the inner part moves from the intermediate position to the second end position, said movement being damped by the damping system since the additional load acting on the inner part is transferred to the damping system. After retardation of the movement and thus reduction of the overload, the preload of the at least one spring member causes the inner part to return to the intermediate position.

The at least one preloading member is, in a structurally simple manner, configured as a screw whose shaft, i.e. the free end of said shaft, is fixed in the first or second connecting member and extends through a passage opening present in the first or second connecting member, so that a stop face formed by the screw, in particular the head of the screw, abuts the first or second connecting member in a form- and force-closed manner. As a result, the screw preloads, for example, the at least one spring member arranged on the first connecting member against the second connecting member, or the at least one spring member arranged on the second connecting member against the first connecting member.

In this case, the preloading member, i.e. the screw, forms a form- and force-closed connection with the first or second connecting member in that a stop face of the preloading member or screw, more particularly the screw head, forms a stop face which engages behind the first or second connecting member and thus abuts a stop face or engaging surface of the first or second connecting member in a force- and form-closed manner. Alternatively, the screw head may also form a stop face for the at least one spring member itself to rest against with a first or second end. In the intermediate position, the first end position, and in the case of a movement of the inner part from the intermediate position to the first end position, the stop face of the preloading member abuts the engaging surface of the first or second connecting member or the first or second end of the at least one spring member. In the case of a movement of the inner part from the intermediate position to the second end position, i.e. in an overload situation, the stop face of the preloading member is lifted off the stop face or engaging surface of the first and/or second connecting member, and the at least one spring member is compressed.

In another preferred variant of the gripper, the damping system is arranged inside the housing, wherein the first connecting member is mounted in a recess on an inner circumferential surface of the housing, and wherein the second connecting member is indirectly connected to the inner part via a holding member extending axially inside the housing. The holding member is in particular an elongate rod, the inner part being fastened to a first, lower end thereof, and the second connecting member being fastened to a second, upper end thereof.

In this case, the second connecting member preferably comprises at least a first, more preferably at least a first load transfer member and a second load transfer member, which are each arranged around the holding member in a rotationally symmetrical manner. Again, the at least one spring member rests with a first end against the first connecting member and with a second end against the second connecting member, in particular the first or second load transfer member. In normal operation, a preload of the at least one spring member is, for example, effected through a stop member arranged inside the housing, against which the first or second connecting member rests with a lateral face facing away from the at least one spring member.

The first load transfer member advantageously comprises an annular plate, and/or the second load transfer member has a T-shaped cross-section, wherein the second end of the at least one spring member rests in particular against said T-shaped load transfer member. The first load transfer member is arranged on a leg of the T-shaped load transfer member, so that in an overload situation the load is transmitted via the holding member, which follows the movement of the inner part from the intermediate position to the second end position, i.e. in the vertical downward direction, to the first load transfer member and then to the second load transfer member, and the at least one spring member is compressed. In normal operation, the second load transfer member, against which the at least one spring member rests with one end, abuts a stop member to preload the at least one spring member.

The damping system preferably comprises at least two and in particular four spring members which are arranged around the inner part and/or the housing, or inside the housing, in particular in an evenly spaced manner.

In an alternative embodiment, the damping system comprises a spring member which is arranged concentrically around the inner part and/or the housing or is arranged inside the housing and concentrically around a central longitudinal axis of the housing and/or the inner part. In this case, the inner part or the housing also serve as a guide for the spring member.

The at least one spring member is preferably a Belleville washer or a stack of Belleville washers, i.e. at least two Belleville washers arranged in series in an axial direction. The spring characteristic or spring force may be set via the number and the way in which the individual Belleville washers are stacked to form a stack or pack of Belleville washers. Belleville washers are advantageous in that, compared to, for example, coil springs, less installation space is required to set a comparable spring characteristic.

To avoid ingress of contaminants and possible loss of fragments of a defective spring member, the at least one spring member is advantageously arranged inside a sleeve, in particular a sleeve with an open face side. During operation, the gripper is under water. The sleeve further provides the advantage that a compression of the spring in an overload situation will cause water to be forced through a small annular gap at the open side of the sleeve, which produces an additional damping effect.

To recognize an overload situation and detect a response of the damping system in the case of a dropping or falling fuel element, the damping system may comprise a detection device which is, in a structurally simple manner, configured as a switch which interrupts an electric circuit once the damping system is active.

BRIEF DESCRIPTION OF THE DRAWINGS

The invention will be explained in more detail below, also with respect to further features and advantages, through the description of embodiment examples and by reference to the accompanying drawings. In the schematic drawings.

DETAILED DESCRIPTION OF THE INVENTION

Figure 1:
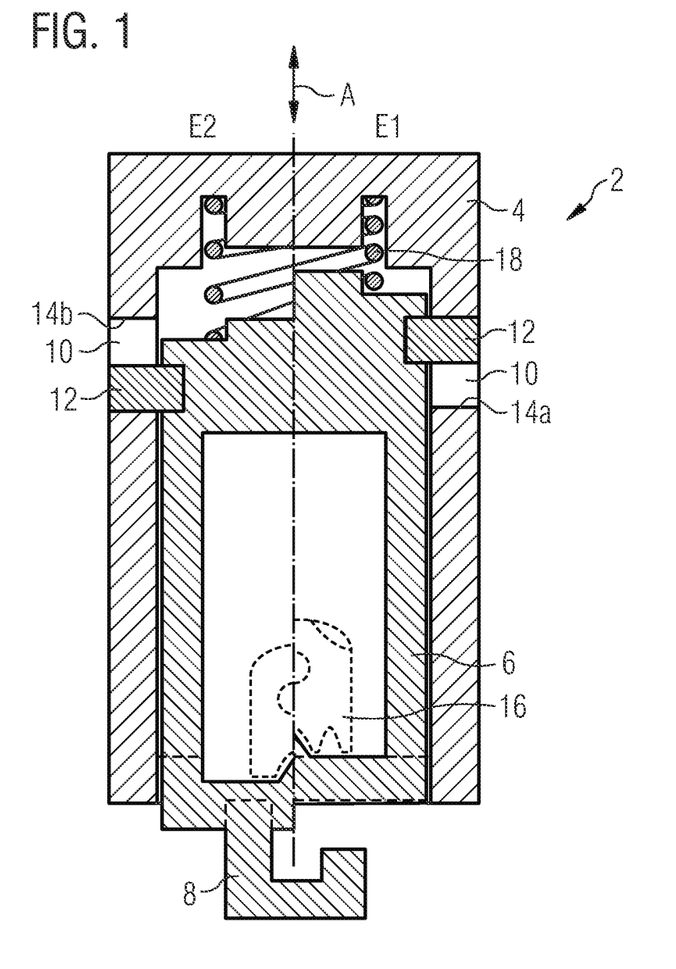
FIG. 1 is a cross-sectional view of a gripper for gripping a fuel element without a damping system.

FIG. 1 shows a lower part of a gripper 2 for transporting a fuel element without a damping system. The gripper 2 comprises a housing 4 for fastening the gripper 2 to a fuel element loading machine, in particular for fastening the gripper 2 to the telescoping mast of a fuel element loading machine. The gripper 2 further comprises an inner part 6 which is arranged to be axially displaceable inside the housing 4. For gripping and putting down a fuel element, the inner part 6 is moved to a first end position E1, which is shown on the right in FIG. 1. During the transport of the fuel element, the inner part 6 is in a second end position E2, which is shown on the left in FIG. 1. One or more catch members 8, which are movable between a gripping position and a release position, are arranged on the inner part 6, only one of them being shown in FIG. 1. The catch member 8 engages a handle or bracket of the fuel element, so that the fuel element is retained at the catch member 8 in a force-closed manner during transport.

The housing 4 of the gripper 2 has two guide grooves 10 in which two stop members 12 fastened to the inner part 6, in the present case keys, are guided for displacement in axial direction A. The guide grooves 10 here form a lower mechanical stop face 14a and an upper mechanical stop face 14b for the stop members 12, so that the inner part 6 is movable relative to the housing 4 only between the first end position E1 and the second end position E2. A block tooth system 16 engages between the inner part 6 and the housing 4, said block tooth system reliably retaining the catch member 8 in the gripping position or the release position depending on the tooth position. Further arranged between the inner part 6 and the housing 4 is a gripper spring 18 which preloads the inner part 6 relative to the housing 4 via the stop members 12. The gripper spring 18 counteracts a movement of the inner part 6 from the second end position E2 to the first end position E1.

During the transport of a fuel element, the latter is retained at the gripper 2 via the catch members 8, which are then in the gripping position, and the stop members 12 rest on the lower stop face 14a, so that the inner part 6 is in the second end position E2 relative to the housing 4. When the gripper 2 makes contact, i.e. during gripping or releasing at the beginning or end of the transport, the fuel element stands on its base and the inner part 6 presses onto the fuel element, i.e. its handle or bracket. In the case of a further downward movement of the gripper 2, the weight of the fuel element loading machine, i.e. its telescoping mast, causes compression of the gripper spring 18, so that the housing 4 is displaced downwards relative to the inner part 6. This continues until the keys 12 abut the upper stop face 14b of the guide grooves 10 and the inner part 6 is in the first end position.

According to the present invention, the gripper 2 described above has a damping system which damps an overload occurring at the gripper and/or the fuel element loading machine in a fault event or overload situation, i.e. reduces additional energy created by a fuel element falling into the catch member 8, to avoid damage to the gripper, the fuel element loading machine or the support structure of the fuel element.

Figure 2:
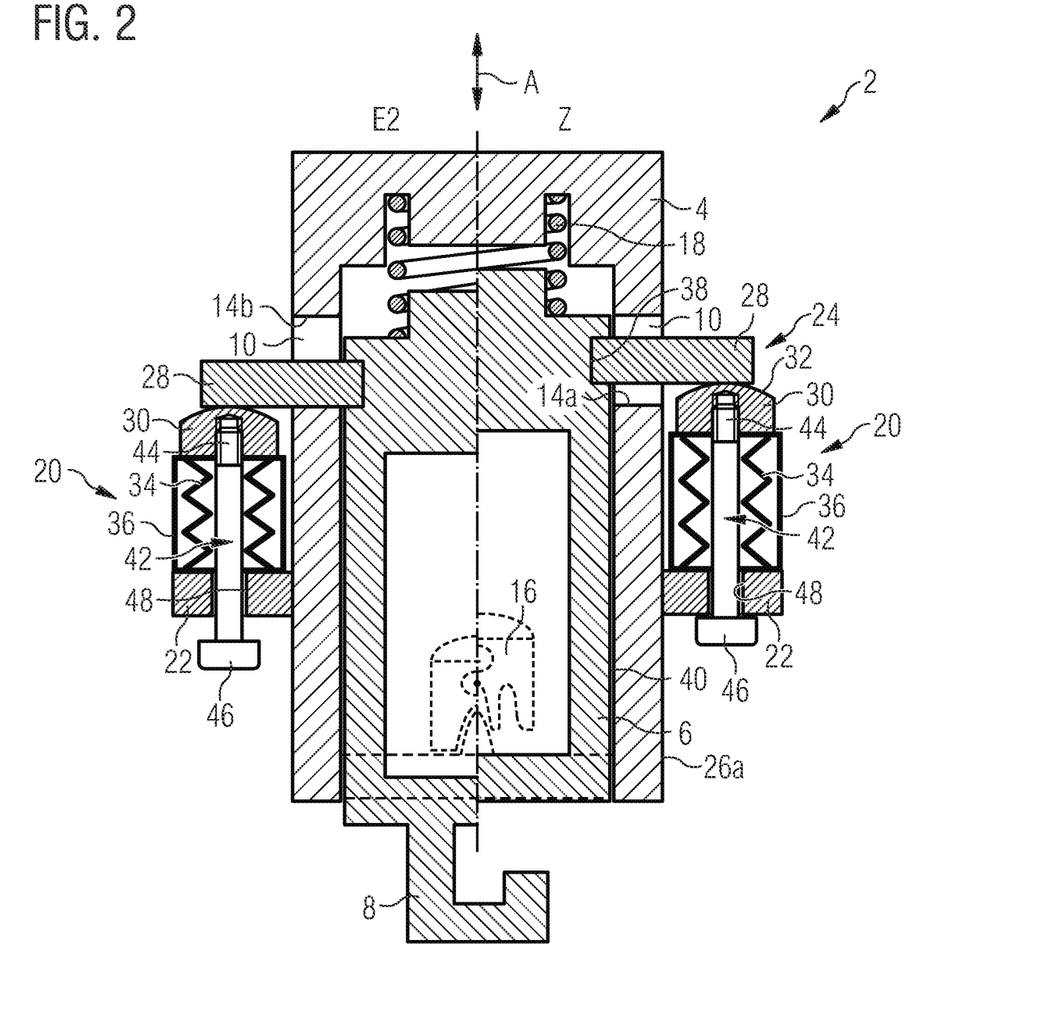
FIG. 2 is a cross-sectional view of a gripper for gripping a fuel element with a damping system according to a first embodiment.

FIG. 2 shows a gripper 2 with a damping system 20 according to a first embodiment. The basic structure of the gripper 2 here corresponds to the features described above, so that reference is essentially made to the above discussion in this regard and only the differences will be explained in more detail below. The right half of FIG. 2 shows the situation in normal operation where the inner part 6 is in an intermediate position Z whereas the left half of FIG. 2 shows an overload situation in which the inner part is in the second end position E2. The intermediate position Z is located in axial direction A between the first and second end positions.

The damping system 20 comprises a first connecting member 22 for connecting the damping system 20 to the housing 4 of the gripper 2 and a second connecting member 24 for connecting the damping system 20 to the inner part 6 of the gripper 2. The first connecting member 22 is configured as an annular plate which is fastened to an outer circumferential surface 26a of the housing 4 through a number of screws not shown and surrounds the housing 4 completely. Alternatively or additionally, the first connecting member 22 could also be retained in an annular recess on the outer circumferential surface 26a of the housing 4 in a form- and force-closed manner. The second connecting member 24 comprises at least one, and in the present case four first load transfer members 28, of which only two are visible in FIG. 2, and a second load transfer member 30 for transferring a load created in the case of a movement of the inner part 6 from an intermediate position Z (right side of FIG. 2) to the second end position E2 (left side of FIG. 2) to the damping system 20. The second load transfer member 30 is likewise configured as an annular plate which surrounds the inner part 6 and the housing 4 completely. A surface 32 of the second load transfer member 30 facing the first load transfer members 28 is configured as a convex curved surface so that the force is transferred to the second load transfer member 30 in a direction perpendicular to the surface 32 and thus almost centrally.

Between the first connecting member 22 and the second connecting member 24, in the present case between the first connecting member 22 and the second load transfer member 30, a total of four spring members 34, which are configured as Belleville washers or stacks of Belleville washers, are evenly spaced around the inner part 6 and the housing 4, although again only two spring members 34 are visible in FIG. 2. Further, each of the spring members 34 is arranged inside a sleeve 36 to prevent an ingress of dirt into the spring chamber.

The first load transfer members 28 are each mounted in a recess 38 on an outer circumferential surface 40 of the inner part 6. In the present case, the first load transfer members 28 are advantageously formed by the stop members 12 of the gripper, which are to this end extended outwards to enable the contact with the second load transfer member 30. Further, in contrast to a gripper without a damping system, two additional stop members or first load transfer members 28, and thus a total of four first load transfer members 28, are provided to distribute the forces acting in an overload situation over a total of four damping systems 20, i.e. four spring members 34. Also, the depth of the recess 38 of the inner part 6 may be increased compared to the gripper 2 without a damping system as described above to absorb the higher bending moments caused by the outward extension of the first load transfer members 28 or keys.

Each spring member 34 rests with a first end against the first connecting member 22 and with a second end against the second load transfer member 30 and is thus arranged in axial direction between the first connecting member 22 and the second connecting member 24.

The damping system 20 comprises four preloading members 42 to preload and guide the spring members 34. The preloading member 42 here is in each case a screw whose shaft 44 is fixed with a free end to the second connecting member 24, i.e. the second load transfer member 30. The screw is movable relative to the first connecting member 22. To this end, the head 46 of the screw extends through a passage opening 48 present in the first connecting member 22 and is thus retained at the first connecting member 22 in a form- and force-closed manner. The preloading members 42, i.e. the screws, each preload a spring member 34 arranged between the first connecting member 22 and the second connecting member 24. Further, the preloading member 42 or screw guides the spring members 34 in axial direction A.

In normal operation and when the inner part 6 is in the intermediate position Z, i.e. during the lifting or lowering or the transport of the fuel element, each first load transfer member 28 rests on the second load transfer member 30. Each spring member 34, or each Belleville washer stack, is designed and preloaded such that it is very stiff and will not compress in normal operation, so that the general kinematics and functionality of the gripper 2 are not changed. The block tooth system 16 is in engagement.

In an overload situation, i.e. when the acting load exceeds the preload, the inner part 6 carrying the load, i.e. the fuel element, moves downwards relative to the housing 4 from the intermediate position Z (right side of FIG. 2) to the second end position E2 (left side of FIG. 2). The distance traveled by the inner part 6 in this case corresponds to the retardation distance required to reduce the overload and thus to the deflection of the Belleville washers. The movement of the inner part 6 from the intermediate position Z to the second end position E2 is damped. Lower and upper stop faces 14a,b of the guide grooves 10 again serve as a mechanical stop. To maintain the original functionality and design of the gripper 2, the guide grooves 10 are preferably extended downwards by the deflection of the Belleville washers. After the retardation, and thus the reduction of the overload, the preload of the spring members 34 causes the inner part 6 to move back up to the initial position, i.e. the intermediate position Z. The block tooth system 16 is in this case modified, for example through additional teeth and recesses, in such a manner that it remains engaged even in the case of a response of the damping system 20.

As before, when the gripper 2 makes contact with a fuel element, the inner part 6 can move upwards in axial direction A relative to the housing 4 from the intermediate position Z to the first end position E1 against the force of the gripper spring 18. The first load transfer members 28 are in this case lifted off the second load transfer member 30 in the upward direction.

Figure 3:
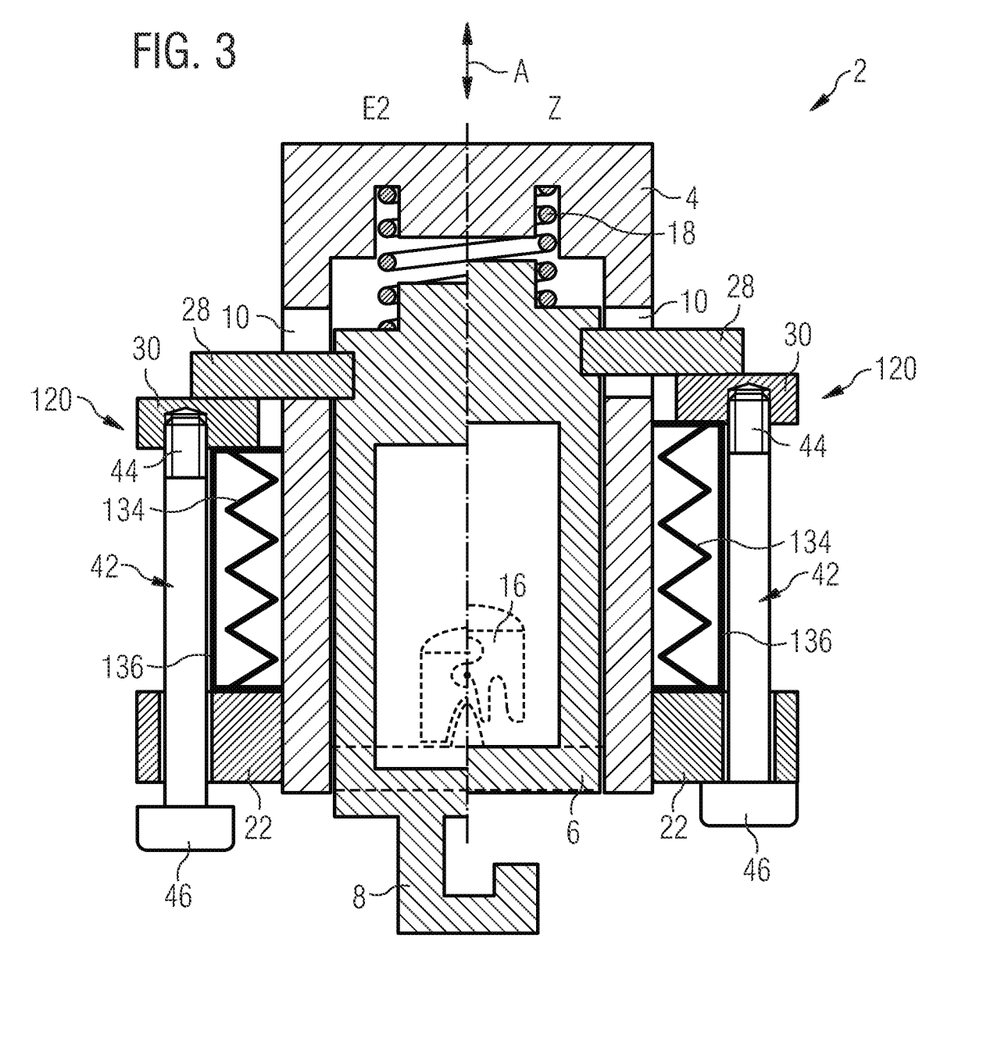
FIG. 3 is a cross-sectional view of a gripper for gripping a fuel element with a damping system according to a second embodiment.

FIG. 3 shows another embodiment of a damping system 120, which essentially corresponds to the embodiment illustrated in FIG. 2 in terms of structure and functionality, so that reference is mostly made to said earlier embodiment with respect to the configuration and functionality. Identical features are designated by like reference numerals, and the right side of FIG. 3 again shows the inner part 6 in the intermediate position Z whereas the left side of FIG. 3 shows an overload situation in which the inner part 6 is in the second end position E2. The difference now consists in the fact that the damping system 120 comprises one spring member 134 which is arranged concentrically around the housing 4 of the gripper 2. The housing 4 thus extends centrally through the spring member 134, i.e. through the stack of Belleville washers, and thus also serves as a guide for the spring member 134. Further, only one sleeve 136 is provided, which surrounds the spring member 134, the housing 4, and the inner part 6 completely.

Figure 4:
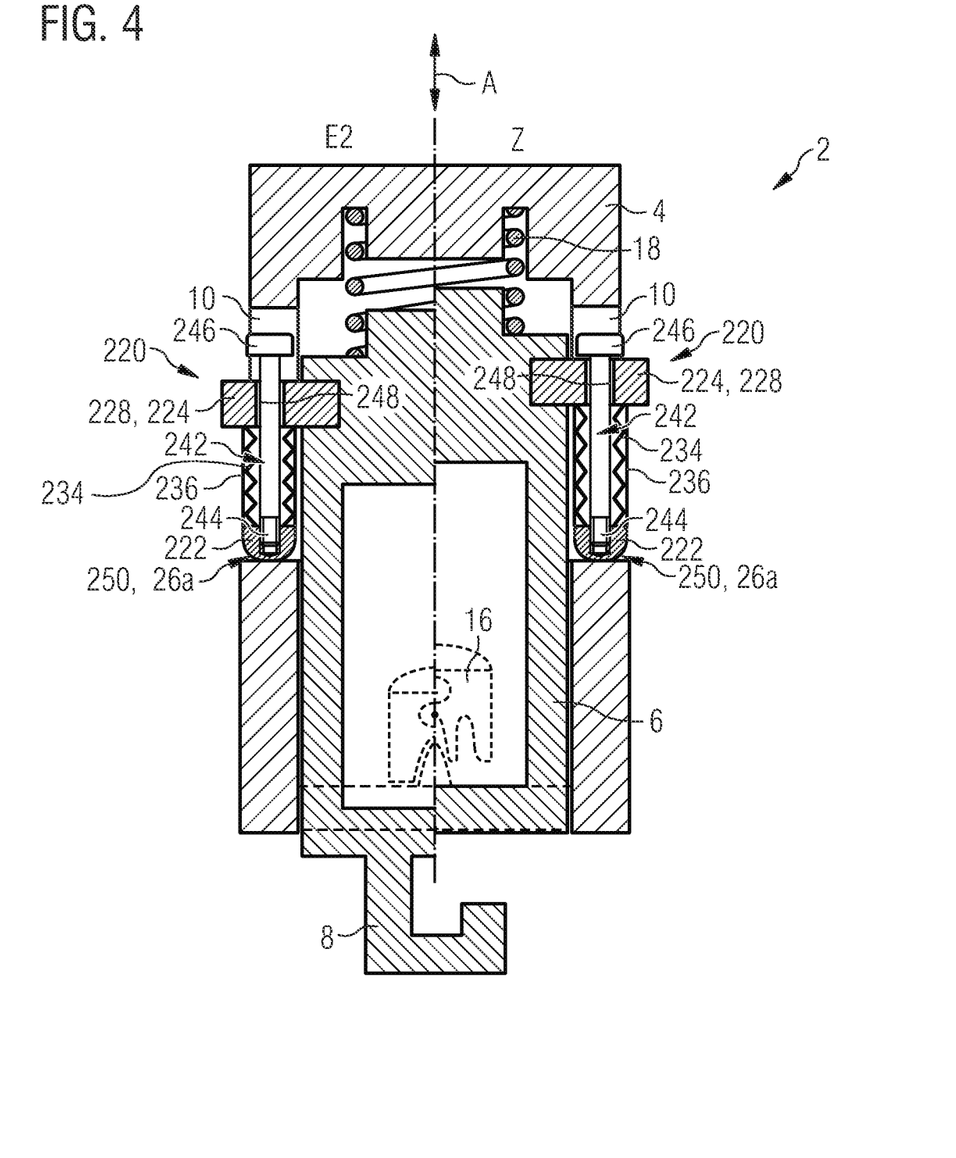
FIG. 4 is a cross-sectional view of a gripper for gripping a fuel element with a damping system according to a third embodiment.

In the embodiment of the damping system 220 illustrated in FIG. 4, the first connecting member 222 is mounted in a recess 250 formed on an outer circumferential surface 26a of the housing 4. The second connecting member 224 comprises four first load transfer members 228 which are mounted in a recess on the outer circumferential surface 40 of the inner part 6 and are again formed by the stop members of the gripper 2. A second or further load transfer member is not required in this embodiment since the damping system 220 is not mounted outside the housing 4 but in the recess 250 and the first load transfer members 228 can thus cooperate directly with the spring members 234, in this case again four spring members 234, of which only two are shown. With this structure, a considerably more compact design of the damping system 220 can be obtained since the latter is shifted inwards and does not, or hardly, project from the outer circumferential surface 26a of the housing 4.

The preloading members 242 for preloading the individual spring members 234 are again configured as a screw and are each fixed to the first connecting member 222 with their shaft 244. The screw, i.e. its shaft 244, extends in each case through a passage opening 248 of the second connecting member 224, i.e. the first load transfer members 228. In the intermediate position Z, a stop face formed by the head 246 abuts the second connecting member 224, i.e. the first load transfer member 228, in a form- and force-closed manner. In the second end position E2, i.e. in an overload situation, the head 246 is lifted off the second connecting member 224, i.e. the first load transfer member 228, in the upward direction.

Otherwise, reference is again made to the discussion of FIG. 2 with regard to configuration and functionality, wherein identical features are again designated by like reference numerals. The right side of FIG. 4 again shows the inner part 6 in the intermediate position Z, and the left side of FIG. 4 shows the overload situation with the inner part 6 in the second end position E2.

Figure 5:
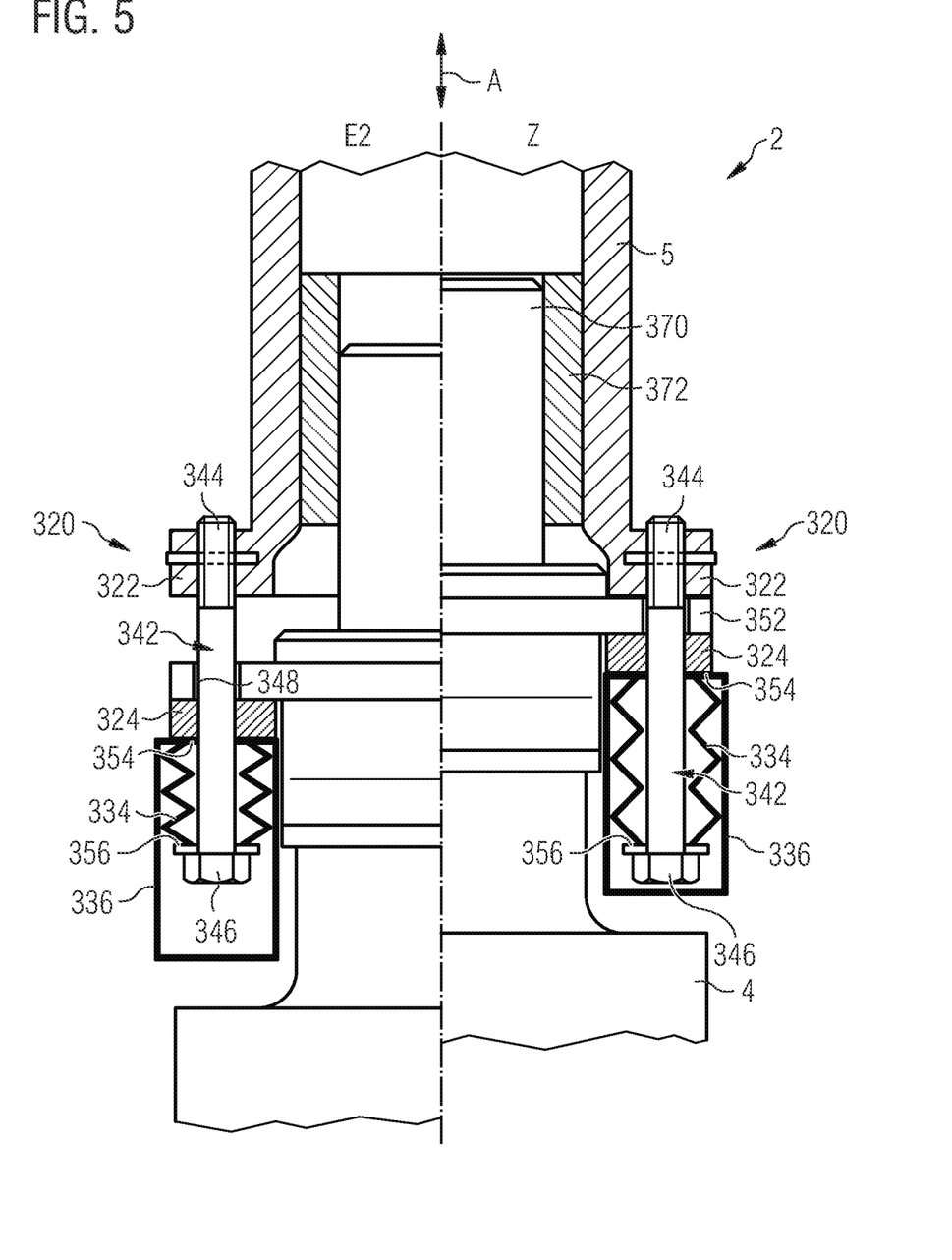
FIG. 5 is a cross-sectional view of a gripper for gripping a fuel element with a damping system according to a fourth embodiment.

The embodiment illustrated in FIG. 5 uses the gripper of FIG. 1, which has been supplemented by a pin 370 at an upper end of the housing 4. The damping system 320 acts between the flange 352 of the gripper and the mast flange of the fuel element loading machine 5, which in this case constitutes the first connecting member 322. The second connecting member 324 is arranged on the housing 4 of the gripper, i.e. connected to it. In an intermediate position Z (right side of FIG. 5), i.e. in normal operation, the first connecting member 322 and the second connecting member 324 are connected to one another indirectly, i.e. via the gripper flange 352. The connecting member 322 is configured as an annular component of the fuel element loading machine 5. The connecting member 324 is in this case configured as an annular plate and surrounds the housing 4 completely. The spring members 334, in this example two spring members 334, rest with a second end against a stop face 354 of the second connecting member 324 facing away from the first connecting member 322. With a first end, the spring members 334 rest against a stop face 356 of the preloading member 342. The first connecting member 322 and the second connecting member 324 are releasably fixed via the gripper flange 352. In an overload situation, i.e. in the case of a movement of the inner part 6 (not shown here) and the entire housing 4 from the intermediate position Z to the second end position E2 (left side of FIG. 5) due to a load acting on the inner part 6 through the fuel element, this fixation can be released by release of the connection of the gripper flange 352. In normal operation and in overload situations, the pin 370 is guided in a linear bearing sleeve 372 inside the mast of the fuel element loading machine 5 at the upper end of the housing 4.

Figure 6:
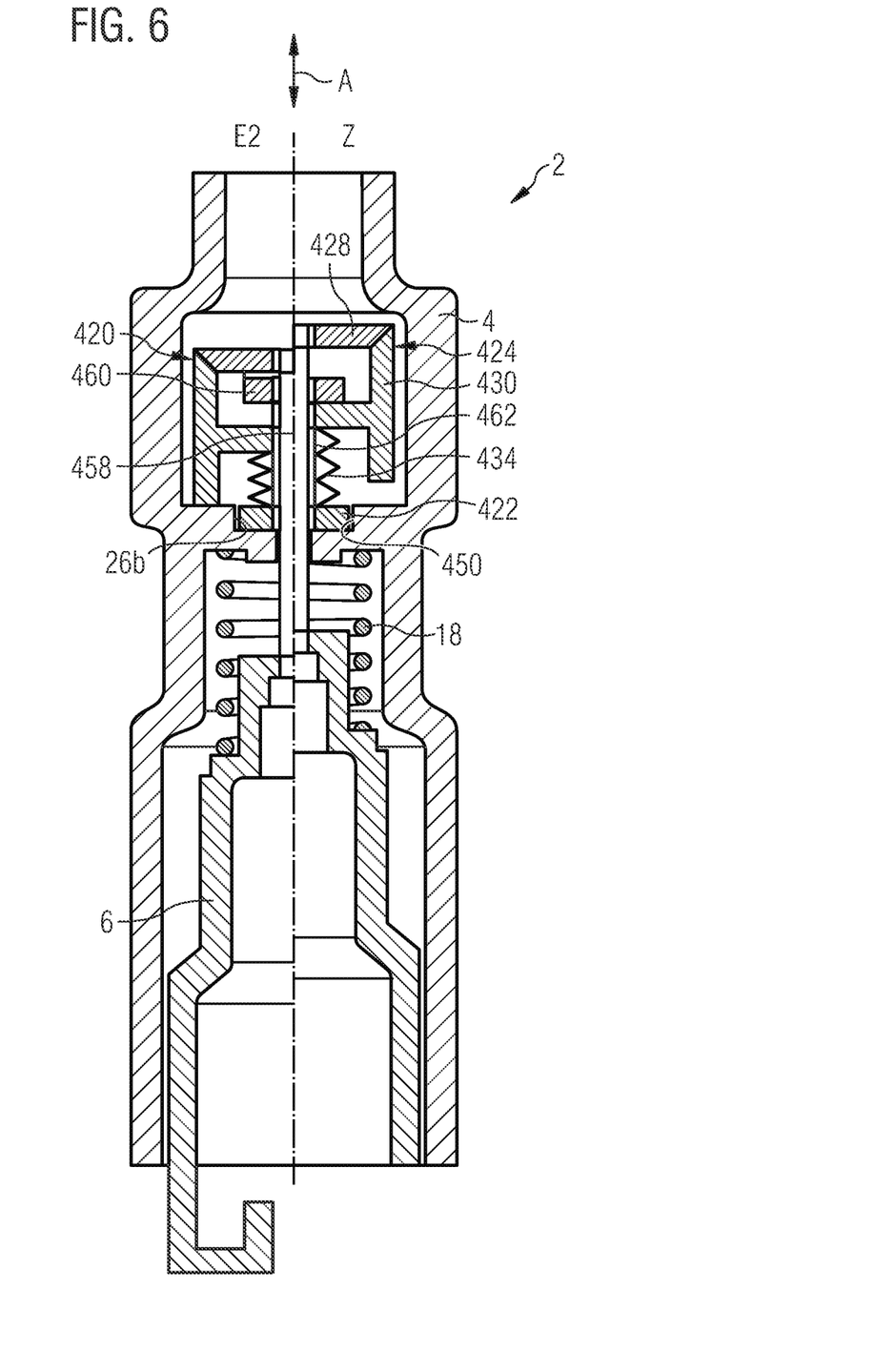
FIG. 6 is a cross-sectional view of a gripper for gripping a fuel element with a damping system according to a fifth embodiment.

FIG. 6 shows another embodiment of a damping system 420, in which the damping system 420 is arranged inside the housing 4. The first connecting member 422 is mounted and retained in a form- and force-closing manner in a recess 450 formed on an inner circumferential surface 26b of the housing 4. The second connecting member 424 is indirectly connected to the inner part 6 via a holding member 458 extending in axial direction A. The holding member 458 is an elongate rod which is fastened to the inner part 6 with a first, lower end section. The second connecting member 424 is connected to a second, upper end section of the holding member 458.

The second connecting member 424 comprises a first load transfer member 428 which is configured as an annular plate arranged around the holding member 458 in a rotationally symmetrical manner and is fastened to the second, upper end section of the holding member 458. In normal operation and in overload situations, the first load transfer member 428 rests on a second load transfer member 430 which is likewise arranged around the holding member 458 in a rotationally symmetrical manner and has a T-shaped cross-section. The spring member 434 of the damping system 420 surrounds the holding member 458 concentrically and rests with a first end against the first connecting member 422 and with a second end against the second connecting member 424, i.e. the second load transfer member 430. The preload of the spring member 434 is in this case achieved through a stop member 460. The stop member 460 is part of a sleeve 462 screwed into the inner part 6 of the gripper, inside which the holding member 458 is guided in axial direction. The stop member 460 is arranged around the holding member 458 in an annular manner.

In normal operation, an upper stop face of the second load transfer member 430 abuts the stop member 460, and the inner part 6 is in the intermediate position Z (right side in FIG. 6). In an overload situation, the inner part 6 of the gripper 2 pulls the first load transfer member 428 fastened to the holding member 458 vertically downwards, so that the first load transfer member 428 presses onto the second load transfer member 430, which is likewise moved vertically downwards against the spring force of the spring member 434. As a result, the spring member 434 is compressed and an overload is reduced.

LIST OF REFERENCE NUMERALS 2 gripper
4 gripper housing
5 fuel element loading machine
6 inner part of gripper
8 catch member
10 guide groove
12 stop member
14a,b lower/upper stop face of guide groove
16 block tooth system
18 gripper spring
20, 120, 220, 320, 420 damping system
22, 222, 322, 422 first connecting member
24, 224, 324, 424 second connecting member
26a outer circumferential surface of housing
26b inner circumferential surface of housing
28, 228, 328, 428 first load transfer member
30, 330, 430 second load transfer member
32 surface of second load transfer member
34, 134, 234, 334, 434 spring member
36, 136, 236, 336 sleeve
38 recess on outer circumferential surface of inner part
40 outer circumferential surface of inner part
42, 142, 242, 342 preloading member
44, 244, 344 screw shaft
46, 246, 326 screw head
48, 248 passage opening
250, 450 recess in housing
352 gripper flange
354 stop face of second connecting member 324
356 stop face of preloading member 342
370 pin at upper end of housing
372 linear bearing sleeve
458 holding member
460 stop member
462 sleeve for stop member
A axial direction
E1 first end position
E2 second end position
Z intermediate position

The invention claimed is:

1. A gripper for gripping a fuel element, comprising
a housing for fastening the gripper to a fuel element loading machine,
an inner part arranged inside the housing, the inner part and the housing being arranged to be displaceable relative to one another in an axial direction such that the inner part is movable between a first end position and a second end position,
at least one catch member movable between a gripping position and a release position,
a gripper spring arranged between the housing and the inner part, which counteracts a movement of the inner part relative to the housing from the second end position, and/or an intermediate position (Z) located in an axial direction between the first end position and the second end position, to the first end position, and
a damping system for damping an overload at the gripper and/or the fuel element loading machine, said damping system comprising at least a first connecting member for connecting the damping system to the housing of the gripper and a second connecting member for connecting the damping system to the inner part of the gripper, or at least a first connecting member for connecting the damping system to the fuel element loading machine and a second connecting member for connecting the damping system to the housing of the gripper, or at least a first connecting member for connecting the damping system to the fuel element loading machine and a second connecting member for connecting the damping system to the inner part of the gripper, and at least one spring member, said at least one spring member being arranged on the first connecting member and/or the second connecting member such that it counteracts a movement of the inner part relative to the housing from the intermediate position (Z) to the second end position,
the inner part has a downward translation movement between its first position and its second end position; and
the gripper spring is compressed in the first end position, wherein the at least one spring member rests with a second end against a stop face of the second connecting member facing away from the first connecting member, and wherein the first connecting member and the second connecting member are indirectly or directly fixed to one another in a releasable manner, said fixation being releasable in the case of a movement of the inner part from the intermediate position (Z) to the second end position.

2. The gripper according to claim 1, wherein the first connecting member is fastened to an inner or outer circumferential surface of the housing or to the fuel element loading machine, through at least one fastener, or is mounted in a recess on an outer or inner circumferential surface of the housing or the fuel element loading machine, or the first connecting member is configured as a part of the fuel element loading machine or the housing.

3. The gripper according to claim 2 wherein the first connecting member is fastened to a telescoping mast of the fuel element loading machine through at least one fastener, or is mounted in a recess on an outer or inner circumferential surface of the housing or the fuel element loading machine.

4. The gripper according to claim 1, wherein the first connecting member comprises an annular plate which surrounds the housing or the fuel element loading machine, or wherein the second connecting member comprises an annular plate which surrounds the inner part or the housing.

5. The gripper according to claim 4, wherein the first connecting member comprises an annular plate which surrounds a telescoping mast of the fuel element loading machine.

6. The gripper according to claim 1 wherein the second connecting member comprises at least one first load transfer member mounted in a recess on an outer circumferential surface-of the inner part.

7. The gripper according to claim 6, wherein the second connecting member comprises at least one first load transfer member and at least one second load transfer member, and wherein the first load transfer member is mounted in the recess on the outer circumferential surface of the inner part and abuts the second load transfer member at least in the intermediate position (Z) and/or in the second end position of the inner part.

8. The gripper according to claim 6, wherein the first connecting member or the second connecting member, have a convex curved surface or a planar surface which abuts the recess of the housing or the first load transfer member.

9. The gripper according to claim 6, wherein the first connecting member or the second load transfer member have a convex curved surface or a planar surface which abuts the recess of the housing and/or the first load transfer member.

10. The gripper according to claim 1, wherein the damping system comprises at least one preloading member for preloading the at least one spring member, which is fixed to the first connecting member and is mounted so as to be movable relative to the second connecting member or is fixed to the second connecting member and is mounted so as to be movable relative to the first connecting member.

11. The gripper according to claim 10, wherein the at least one preloading member is a screw whose shaft is fixed in the first or second connecting member and extends through a passage opening present in the first or second connecting member, so that a stop face formed by the preloading member abuts the first or second connecting member in a form- and force-closed manner.

12. The gripper according to claim 1, wherein the damping system comprises at least two spring members arranged around the inner part and/or the housing or inside the housing, in an evenly spaced manner, or wherein the damping system comprises a spring member arranged concentrically around the inner part and/or the housing or arranged inside the housing and concentrically around a central longitudinal axis of the housing and/or the inner part.

13. The gripper according to claim 1, wherein the at least one spring member is a Belleville washer or a stack of Belleville washers, and/or wherein the at least one spring member is arranged inside a sleeve.

* * * * *